(12) United States Patent
Liu et al.

(10) Patent No.: US 12,052,379 B1
(45) Date of Patent: Jul. 30, 2024

(54) METHOD, SYSTEM AND DEVICE FOR DETECTING ABNORMAL NODE IN BLOCKCHAIN AND STORAGE MEDIUM

(71) Applicant: Yantai University, Yantai (CN)

(72) Inventors: Zhaowei Liu, Yantai (CN); Tao Wang, Yantai (CN); Yingjie Wang, Yantai (CN); Peiyong Duan, Yantai (CN); Mingjie Lu, Yantai (CN); Yongchao Song, Yantai (CN); Haiyang Wang, Yantai (CN)

(73) Assignee: Yantai University, Yantai (CN)

( * ) Notice: Subject to any disclaimer, the term of this patent is extended or adjusted under 35 U.S.C. 154(b) by 0 days.

(21) Appl. No.: 18/501,096

(22) Filed: Nov. 3, 2023

(51) Int. Cl.
  *H04L 9/00* (2022.01)

(52) U.S. Cl.
  CPC ...................................... *H04L 9/50* (2022.05)

(58) Field of Classification Search
  CPC ........................................................ H04L 9/50
  See application file for complete search history.

(56) References Cited

U.S. PATENT DOCUMENTS

| | | | | |
|---|---|---|---|---|
| 10,831,452 | B1* | 11/2020 | Hunter | G06N 5/01 |
| 11,321,394 | B2* | 5/2022 | Wright | G06F 16/90335 |
| 2018/0239959 | A1* | 8/2018 | Bui | G06F 16/93 |
| 2019/0122140 | A1* | 4/2019 | Sen | G06N 5/01 |
| 2019/0213254 | A1* | 7/2019 | Ray | G06N 7/01 |
| 2019/0259114 | A1* | 8/2019 | Spangenberg | G06F 16/93 |
| 2019/0320006 | A1* | 10/2019 | Allen | H04L 65/613 |
| 2020/0364084 | A1* | 11/2020 | Zheng | H04L 67/10 |
| 2021/0073282 | A1* | 3/2021 | Hunter | G06F 8/33 |
| 2021/0209483 | A1* | 7/2021 | Bose | G06N 5/025 |
| 2022/0038289 | A1* | 2/2022 | Huang | G06F 16/27 |

FOREIGN PATENT DOCUMENTS

| | | |
|---|---|---|
| CN | 114240659 A | 3/2022 |
| CN | 114444074 A | 5/2022 |
| CN | 114612235 A | 6/2022 |
| CN | 114626890 A | 6/2022 |
| CN | 116361734 A | 6/2023 |

OTHER PUBLICATIONS

Shenqiang Wang et al., "Ensuring security in edge computing through effective blockchain node detection", Journal of Cloud Computing, Jun. 15, 2023.

\* cited by examiner

*Primary Examiner* — Taghi T Arani
*Assistant Examiner* — Blake I Narramore

(57) ABSTRACT

The invention relates to the field of blockchain technologies, and is particularly a method, system and device for detecting an abnormal node in a blockchain and a storage medium. In the detection method, node data are extracted and analyzed in a defeatured manner through various information sources, and finally, a high-quality graph structure with high accuracy, strong applicability and small error is obtained, so that high-order neighbor features with rich feature information are obtained, thus being convenient for further classified detection, improving the accuracy of detection results, and being beneficial for maintaining the safety of blockchain.

4 Claims, 2 Drawing Sheets

METHOD, SYSTEM AND DEVICE FOR DETECTING ABNORMAL NODE IN BLOCKCHAIN AND STORAGE MEDIUM

CROSS REFERENCE TO RELATED APPLICATIONS

This application claims foreign priority of Chinese Patent Application No. 202310973153.3, filed on Aug. 4, 2023 in the China National Intellectual Property Administration, the disclosures of all of which are hereby incorporated by reference.

TECHNICAL FIELD

The present invention relates to the field of blockchain technologies, and particularly relates to a method, system and device for detecting an abnormal node in a blockchain and a storage medium.

BACKGROUND OF THE PRESENT INVENTION

The detection of an abnormal node in a blockchain is to abstract the blockchain into a graph structure and then detect the abnormal node in the graph structure. The abnormal node in the blockchain may contain harmful information such as fraud and falsehood information, which has a negative impact on a normal user and a platform environment of the blockchain. The detection of such abnormal node is of great significance to the healthy development of the blockchain.

There has been a graph neural network model for the detection of the abnormal node currently, which ignores an influence of the graph structure and only focuses on how to improve node embedding. Because of a recursive aggregation scheme of GNN (Graph Neural Networks), a false link is established between a fraud account and a real account, so that it is easy to inject false information into the whole network, leading to a difficulty of estimating account credibility. In addition, recent researches show that an unobtrusive intentional disturbance (also known as an antagonistic attack) in the graph structure can easily lead to the wrong prediction of most GNN. Therefore, a GNN learning information representation usually needs the high-quality graph structure to reduce an influence of noise data on the detection of the abnormal node in the blockchain. However, information in the graph structure obtained at present has a large error and a poor quality, and the noise data have a great influence on the detection of the abnormal node in the blockchain, so that an accuracy rate of detection results is low.

SUMMARY OF PRESENT INVENTION

The present invention aims to provide a method, system and device for detecting an abnormal node in a blockchain and a storage medium.

The present invention adopts a technical solution as follows. A method for detecting an abnormal node in a blockchain comprises the following operations of:

S1: acquiring a node data set, converting the node data set into an initial graph structure, and obtaining an initial adjacency matrix based on the initial graph structure;

S2: obtaining a node representation by carrying out a first feature extraction treatment on the initial adjacency matrix; and obtaining an observation set based on the node representation;

S3: obtaining a probability of existence of an optimal graph structure based on edge information between nodes; obtaining a probability of existence of an edge in the optimal graph structure based on the observation set and edge observation information between nodes in the optimal graph structure; and obtaining a posterior probability of the optimal graph structure by carrying out a conditional probability treatment on the probability of existence of the optimal graph structure and the probability of existence of the edge in the optimal graph structure;

S4: obtaining the optimal graph structure by carrying out an expectation maximization treatment on the posterior probability of the optimal graph structure; obtaining an optimal adjacency matrix based on the optimal graph structure; and obtaining the high-order neighbor features by carrying out a second feature extraction treatment on the optimal adjacency matrix; and S5: obtaining a node detection result by carrying out a classification treatment on the high-order neighbor features.

According to the method for detecting above, the operation of obtaining the observation set in the S2 specifically comprises: obtaining a nearest neighbor graph based on the node representation and a node data feature, and obtaining the observation set by adding the initial adjacency matrix into the nearest neighbor graph.

According to the method for detecting above, the operation of obtaining the probability of existence of the optimal graph structure in the S3 is realized by the following formula:

$$P(\dot{G}|\Phi,Z,Y_I)=\Pi_{i<j}\Phi_{c_ic_j}{}^{G_{ij}}(1-\Phi_{c_ic_j})^{1-G_{ij}},$$

wherein, $P(\dot{G}|\Phi, Z, Y_I)$ is the probability of existence of the optimal graph structure, $\dot{G}$ is the optimal graph structure, $\Phi$ is whether a node between communities has an edge, when the node has the edge, $\Phi=1$, when the node does not have the edge, $\Phi=0$, Z is a node prediction label, $Y_I$ is a node input label, $\Phi_{c_jj_i}{}^{G_{ij}}$ is a probability of existence of an edge between a node $v_i$ in a community $c_i$ and a node $v_j$ in a community $c_j$, $(1-\Phi_{c_jj_i})^{1-G_{ij}}$ is a probability of non-existence of the edge between the node $v_i$ and the node $v_j$, $\Phi_{c_jj_i}$ is a probability of existence of an edge between the community $c_i$ and the community $c_j$, $G_{ij}$ is whether an edge exists between the node $v_i$ and the node $v_j$, when the edge exists, $G_{ij}=1$, and when the edge does not exist, $G_{ij}=0$.

According to the method for detecting above, the operation of obtaining the probability of existence of the edge in the optimal graph structure in the S3 is realized by the following formula:

$$P(O|\dot{G},\gamma,\eta)=\Pi_{i<j}[\gamma^{E_{ij}}(1-\eta)^{M-E_{ij}}]^{1-G_{ij}},$$

wherein, $P(O|\dot{G}, \gamma, \eta)$ is the probability of existence of the edge in the optimal graph structure, O is the observation set, $\dot{G}$ is the optimal graph structure; $\gamma$ is whether the edge in the optimal graph structure is observed, when the edge is observed, $\gamma=1$, when the edge is not observed, $\gamma=0$, $\eta$ is whether the edge exists in the optimal graph structure, when the edge exists, $\eta=1$, when the edge does not exist, $\eta=0$, $E_{ij}$ is a number of times when the edge between the node $v_i$ and the node $v_j$ is observed, M is a number of times of observation, $G_{ij}$ is whether the edge exists between the node $v_i$ and the node $v_j$, when the edge exists, $G_{ij}=1$, and when the edge does not exist, $G_{ij}=0$.

According to the method for detecting above, the operation of obtaining the posterior probability of the optimal graph structure in the S3 is realized by the following formula:

$$P(\hat{G}, \Phi, \gamma, \eta \mid O, Z, Y_l) = \frac{P(O \mid \hat{G}, \gamma, \eta)P(\hat{G} \mid \Phi, Z, Y_L)P(\Phi)P(\gamma)P(\eta)}{P(O, Z, Y_L)},$$

wherein, $P(\hat{G}, \Phi, \gamma, \eta \mid O, Z, Y_L)$ is the posterior probability of the optimal graph structure, $\hat{G}$ is the optimal graph structure, $\Phi$ is whether the node between communities has the edge, when the node has the edge, $\Phi=1$, when the node does not have the edge, $\Phi=0$, $P(\Phi)$ is a probability of existence of the edge of the node between communities, when the edge exists, $P(\Phi)=1$, when the edge does not exist, $P(\Phi)=0$, $\gamma$ is whether the edge in the optimal graph structure is observed, when the edge is observed, $\gamma=1$, when the edge is not observed, $\gamma=0$, $P(\gamma)$ is a probability of observation of the edge in the optimal graph structure, when the edge is observed, $P(\gamma)=1$, when the edge is not observed, $P(\gamma)=0$, $\eta$ is whether the edge exists in the optimal graph structure, when the edge exists, $\eta=1$, when the edge does not exist, $\eta=0$, $P(\eta)$ is a probability of existence of the edge in the optimal graph structure, when the edge exists, $P(\eta)=1$, when the edge does not exist, $P(\eta)=0$, 0 is the observation set, Z is the node prediction label, and $Y_l$ is the node input label; and $P(O \mid \hat{G}, \gamma, \eta)$ is a probability of existence of the edge in the optimal graph structure, $P(\hat{G}, Z, Y_l)$ is a probability of existence of the optimal graph structure, and $P(O, Z, Y_l)$ is a probability of co-existence of the observation set, the prediction label and the input label.

According to the method for detecting above, the operation of obtaining the optimal graph structure in the S4 is realized by the following formula:

$$\hat{G} = \frac{\Phi_{c_ic_j}\gamma^{E_{ij}}(1-\gamma)^{M-E_{ij}}}{\Phi_{c_ic_j}\gamma^{E_{ij}}(1-\gamma)^{M-E_{ij}} + (1-\Phi_{c_ic_j})\eta^{E_{ij}}(1-\eta)^{M-E_{ij}}},$$

wherein, a is the optimal graph structure, $\Phi_{c_jj_i}$ is a probability of existence of the edge between the node $v_i$ in the community $c_i$ and the node $v_j$ in the community $c_j$, $G_{ij}$ is whether the edge exists between the node $v_i$ and the node $v_j$, when the edge exists, $G_{ij}=1$, when the edge does not exist, $G_{ij}=0$, $\gamma$ is whether the edge in the optimal graph structure is observed, when the edge is observed, $\gamma=1$, when the edge is not observed, $\gamma=0$, $E_{ij}$ is the number of times when the edge between the node $v_i$ and the node $v_j$ is observed, M is the number of times of observation, $\eta$ is whether the edge exists in the optimal graph structure, when the edge exists, $\eta=1$, and when the edge does not exist, $\eta=0$.

According to the method for detecting above, after the operation of obtaining the node detection result in the S5, an operation of judging an attribute of the node detection result is further comprised, when the attribute of the node detection result is a normal node, the normal node is periodically detect; and when the attribute of the node detection result is an abnormal node, the abnormal node is deleted from the blockchain.

A system for detecting an abnormal node in a blockchain comprises:

an initial adjacency matrix generation module configured for acquiring a node data set, converting the node data set into an initial graph structure, and obtaining an initial adjacency matrix based on the initial graph structure;

an observation set generation module configured for obtaining a node representation by carrying out a first feature extraction treatment on the initial adjacency matrix; and obtaining an observation set based on the node representation;

a posterior probability generation module of an optimal graph structure configured for obtaining a probability of existence of an optimal graph structure based on edge information between nodes; obtaining a probability of existence of an edge in the optimal graph structure based on the observation set and edge observation information between nodes in the optimal graph structure; and obtaining a posterior probability of the optimal graph structure by carrying out a conditional probability treatment on the probability of existence of the optimal graph structure and the probability of existence of the edge in the optimal graph structure;

a high-order neighbor feature generation module configured for obtaining the optimal graph structure by carrying out an expectation maximization treatment on the posterior probability of the optimal graph structure; obtaining an optimal adjacency matrix based on the optimal graph structure; and obtaining the high-order neighbor features by carrying out a second feature extraction treatment on the optimal adjacency matrix; and a node detection result generation module configured for obtaining a node detection result by carrying out a classification treatment on the high-order neighbor features.

A device for detecting an abnormal node in a blockchain comprises a processor and a storage, wherein when the processor executes a computer program stored in the storage, the method for detecting the abnormal node in the blockchain above is realized.

A computer-readable storage medium is configured for storing a computer program, wherein when the computer program is executed by a processor, the method for detecting the abnormal node in the blockchain above is realized.

The beneficial effects of the present invention are as follows:

the present invention provides the method for detecting the abnormal node in the blockchain, in which the observation set is established based on the node representation with rich information obtained by carrying out the first feature extraction treatment on the initial adjacency matrix, the observation model is established by combining the observation set with edge observation information between nodes to obtain the probability of existence of the edge in the optimal graph structure, the probability of existence of the optimal graph structure is obtained based on the edge information between nodes at the same time, the posterior probability of the optimal graph structure is obtained after carrying out a Bayesian analysis treatment on the probability of existence of the optimal graph structure and the probability of existence of the edge in the optimal graph structure, so that it is expected to maximize the posterior probability of the optimal graph structure to obtain the optimal graph structure, node data are extracted and analyzed in a defeatured manner through various information sources, and finally, a high-quality graph structure with high accuracy, strong applicability and small error is obtained, so that the high-order neighbor features with rich feature information are obtained, thus being convenient for further classification and detection, improving the accuracy of detection results to further update a node authority according to the detection results, and being beneficial for maintaining the safety of blockchain.

DESCRIPTION OF THE DRAWINGS

By reading the following detailed description of preferred embodiments, solutions and advantages of the present application will be clear to those skilled in the art. The drawings are only for the purpose of illustrating the preferred embodiment, and are not considered as limiting the present invention.

In the Drawings.

DETAILED DESCRIPTION OF PREFERRED EMBODIMENTS

Exemplary embodiments of the present disclosure will be described in detail hereinafter with reference to the drawings.

Figure 1:
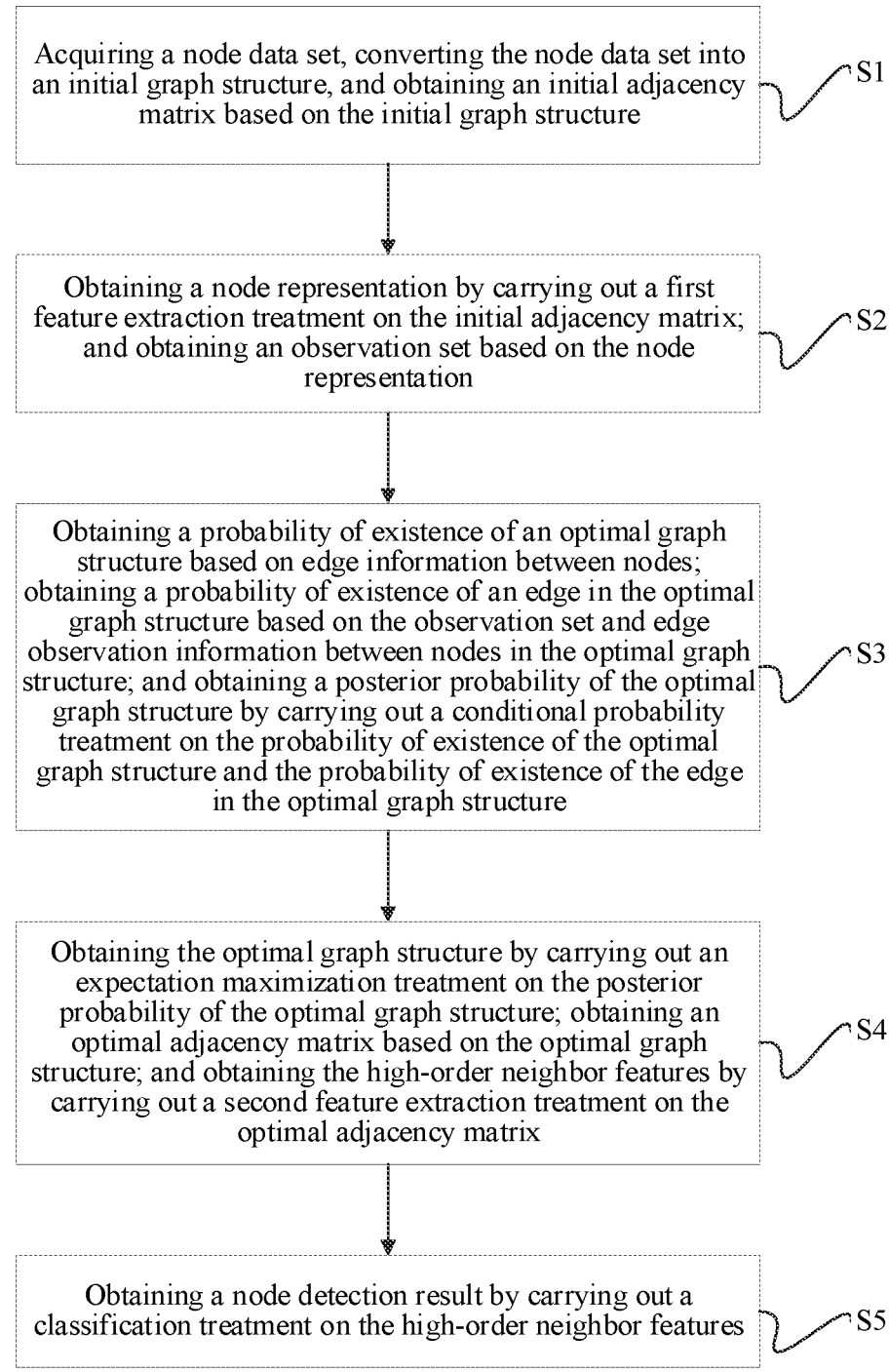
FIG. 1 is a flow chart of a method for detecting in an embodiment.

An embodiment of the present invention provides a method for detecting an abnormal node in a blockchain, which, with reference to FIG. 1, comprises the following operations of:

S1: acquiring a node data set, converting the node data set into an initial graph structure, and obtaining an initial adjacency matrix based on the initial graph structure;

S2: obtaining a node representation by carrying out a first feature extraction treatment on the initial adjacency matrix; and obtaining an observation set based on the node representation;

S3: obtaining a probability of existence of an optimal graph structure based on edge information between nodes; obtaining a probability of existence of an edge in the optimal graph structure based on the observation set and edge observation information between nodes in the optimal graph structure; and obtaining a posterior probability of the optimal graph structure by carrying out a conditional probability treatment on the probability of existence of the optimal graph structure and the probability of existence of the edge in the optimal graph structure;

S4: obtaining the optimal graph structure by carrying out an expectation maximization treatment on the posterior probability of the optimal graph structure; obtaining an optimal adjacency matrix based on the optimal graph structure; and obtaining the high-order neighbor features by carrying out a second feature extraction treatment on the optimal adjacency matrix; and S5: obtaining a node detection result by carrying out a classification treatment on the high-order neighbor features.

In the S1, the node data set is acquired, the node data set is converted into the initial graph structure, and the initial adjacency matrix is obtained based on the initial graph structure.

The node data set is acquired. Transaction information of the node in the blockchain published on the Internet is acquired, the transaction information comprises, but is not limited to, a transaction amount, a transaction time and a transaction object, and the node data set is formed.

The graph is established. After the node data set is subjected to the graph establishment, an initial graph structure is obtained, the initial graph structure is represented by G, and G=(V, E, X) is set, wherein V represents a set of nodes in the graph, E represents a set of edges in the graph, and X represents a feature matrix of nodes.

The adjacency matrix is established. After the initial graph structure is subjected to the adjacency matrix establishment, an initial adjacency matrix is obtained.

In the S2, the node representation is obtained by carrying out the first feature extraction treatment on the initial adjacency matrix; and the observation set is obtained based on the node representation.

The operation of the first feature extraction treatment may be realized by a first convolution operation, such as being realized by the following convolution formula:

$$H^{(l+1)} = \sigma\left(\sum_{i=1}^{f_l} \ell(A \odot M_{i,j}^{(l)}) H^{(l)}[:, i] W^{(l)}[i, j]\right),$$

for $j = 1, \ldots, f_{l+1}$, for $i = 1, \ldots, f_{l+1}$, wherein, $H^{(l+1)}$ is the node representation, σ is a Sigmoid function, l( ) is a normalization operator, A is the initial adjacency matrix, ⊙ is Hadamard product multiplication, $M_{i,j}^{(l)}$ is a Sparse random matrix, $l(A)=I_N+D^{-1/2}AD^{-1/2}$, $I_N$ is a unit matrix, with a dimension of N rows and N columns, N is a number of nodes, and in order to avoid a situation that features of the nodes are not aggregated in an aggregation process, it is necessary to add one unit matrix, so that the features of the nodes are aggregated while features of neighbor nodes are aggregated; D is a degree matrix of the initial adjacency matrix A, $f_l$ and $f_{l+1}$ are respectively numbers of features of a $1^{st}$ layer and an $1+1^{th}$ layer, $H^{(l)}[:, i]$ is a feature matrix of the $1^{st}$ layer, $W^{(l)}[i,j]$ is a weight matrix of an $1^{th}$ layer, i represents a number of features of the $1^{th}$ layer, j represents a number of features of the $1+1^{th}$ layer, and 1 is a number of convolution layers.

The observation set is established. The operation of obtaining the observation set specifically comprises: obtaining a nearest neighbor graph based on the node representation and a node data feature, and obtaining the observation set by adding the initial adjacency matrix into the nearest neighbor graph. The node representation $H=\{H^0, H^1, \ldots, H^l, H^{l+1}\}$ is reserved, a k-nearest neighbor graph (kNN graph) is established based on the node representation, the kNN graph is marked as $O^{(i)}=\{O^{(0)}, O^{(1)}, \ldots, O^{(l)}, O^{(l+1)}\}$, the establishment process comprises calculating an Euclidean distance of a node v, finding out nearest k neighbors, and connecting the node v with these neighbors to form k directed edges, all nodes on the graph are operated in this way, and finally, the kNN graph may be obtained. Because the initial adjacency matrix A also contains important graph structure information, the initial adjacency matrix A is merged into the nearest neighbor graph to obtain the observation set O={A, $O^{(0)}$, $O^{(1)}$, . . . , $O^{(l)}$, $O^{(l+1)}$}.

In the S3, the probability of existence of the optimal graph structure is obtained based on the edge information between nodes; the probability of existence of the edge in the optimal graph structure is obtained based on the observation set and the edge observation information between nodes in the optimal graph structure; and the posterior probability of the optimal graph structure is obtained by carrying out the conditional probability treatment on the probability of existence of the optimal graph structure and the probability of existence of the edge in the optimal graph structure.

The operation of obtaining the probability of existence of the optimal graph structure is realized by the following formula:

$$P(\hat{G}|\Phi, Z, Y_l) = \Pi_{i<j} \Phi_{c_i c_j}^{G_{ij}} (1-\Phi_{c_i c_j})^{1-G_{ij}},$$

wherein, $P(\hat{G}|, Z, Y_l)$ is the probability of existence of the optimal graph structure, $\hat{G}$ is the optimal graph structure, $\Phi$ is whether a node between communities has an edge, when the node has the edge, $\Phi=1$, when the node does not have the edge, $\Phi=0$, Z is a node prediction label, $Y_l$ is a node input label, $\Phi_{c_j j_i}^{G_{ij}}$ is a probability of existence of an edge $c_j$, between a node $v_i$ in a community $c_i$ and a node $v_j$ in a community $c_j$, $(1-\Phi_{c_j j_i})^{1-G_{ij}}$ is a probability of non-existence of the edge between the node $v_i$ and the node $v_j$, $\Phi_{c_j j_i}$ is a probability of existence of an edge between the community $c_i$ and the community $c_j$, $G_{ij}$ is whether an edge exists between the node $v_i$ and the node $v_j$, when the edge exists, $G_{ij}=1$, and when the edge does not exist, $G_{ij}=0$. The above community is an aggregation area composed of nodes with the same label attribute. The probability of existence of the optimal graph structure may be obtained by multiplying each node in the initial graph structure.

$$c_i = \begin{cases} y_i & \text{if } v_i \in V_L \\ z_i & \text{otherwise} \end{cases},$$

wherein $y_i$ is an input label of the node $v_i$, and $z_i$ is a final prediction label of the node $v_i$.

The operation of obtaining the probability of existence of the optimal graph structure above may be realized by establishing a structural model based on a stochastic block model (SBM model).

The operation of obtaining the probability of existence of the edge in the optimal graph structure is realized by the following formula:

$$P(O|\hat{G},\gamma,\eta) = \Pi_{i<j} [\gamma^{E_{ij}} (1-\gamma)^{M-E_{ij}}]^{1-G_{ij}},$$

wherein, $P(O|\hat{G}, \gamma, \eta)$ is the probability of existence of the edge in the optimal graph structure, O is the observation set, and $\hat{G}$ is the optimal graph structure; $\gamma$ is whether the edge in the optimal graph structure is observed, when the edge is observed, $\gamma=1$, when the edge is not observed, $\gamma=0$, $\eta$ is whether the edge exists in the optimal graph structure, when the edge exists, $\eta=1$, when the edge does not exist, $\eta=0$, $E_{ij}$ is a number of times when the edge between the node $v_i$ and the node $v_j$ is observed, and His a number of times of observation. $G_{ij}$ is whether an edge exists between the node $v_i$ and the node $v_j$, when the edge exists, $G_{ij}=1$, and when the edge does not exist, $G_{ij}=0$. In the M times of observation, the probability of existence of the edge between the node $v_i$ and the node $v_j$ is $\gamma^{E_{ij}}(1-\gamma)^{M-E_{ij}}$, and when the initial graph structure does not have the edge, the probability is $\eta^{E_{ij}}(1-\eta)^{M-E_{ij}}$ under a condition of $E_{i,j}$.

The process of obtaining the probability of existence of the edge in the optimal graph structure above is also a process of establishing an observation model.

The posterior probability of the optimal graph structure is obtained. Based on the structural model and the observation model, the posterior probability $P(\hat{G}, \Phi, \gamma, \eta|O, Z, Y_l)$ of the optimal graph structure is calculated by Bayesian inference, and a calculation formula is as follows:

$$P(\hat{G}, \Phi, \gamma, \eta | O, Z, Y_l) = \frac{P(O | \hat{G}, \gamma, \eta) P(\hat{G} | \Phi, Z, Y_l) P(\Phi) P(\gamma) P(\eta)}{P(O, Z, Y_L)},$$

wherein, $P(\Phi)$ is a probability of existence of the edge of the node between communities, when the edge exists, $P(\Phi)=1$, when the edge does not exist, $P(\Phi)=0$, $P(\gamma)$ is a probability of observation of the edge in the optimal graph structure, when the edge is observed, $P(\gamma)=1$, when the edge is not observed, $P(\gamma)=0$, $P(\eta)$ is a probability of existence of the edge in the optimal graph structure, when the edge exists, $P(\eta)=1$, and when the edge does not exist, $P(\eta)=0$; and $P(O, Z, Y_l)$ is a probability of co-existence of the observation set, the prediction label and the input label.

In the S4, the optimal graph structure is obtained by carrying out the expectation maximization treatment on the posterior probability of the optimal graph structure; the optimal adjacency matrix is obtained based on the optimal graph structure; and the high-order neighbor features are obtained by carrying out the second feature extraction treatment on the optimal adjacency matrix.

The optimal graph structure is obtained. The posterior probability $P(\hat{G}, \Phi, \gamma, \eta|O, Z, Y_L)$ of the optimal graph structure is treated by an expectation maximization (EM) algorithm to obtain the optimal graph structure $\hat{G}$. A calculation formula is:

$$\hat{G} = \frac{\Phi_{c_i c_j} \gamma^{E_{ij}} (1-\gamma)^{M-E_{ij}}}{\Phi_{c_i c_j} \gamma^{E_{ij}} (1-\gamma)^{M-E_{ij}} + (1-\Phi_{c_i c_j}) \eta^{E_{ij}} (1-\eta)^{M-E_{ij}}}.$$

$\hat{G}$ is the optimal graph structure, $\Phi_{c_j j_i}$ is a probability of existence of the edge between the node $v_i$ in the community $c_i$ and the node $v_j$ in the community $c_j$, $G_{ij}$ is whether an edge exists between the node $v_i$ and the node $v_j$, when the edge exists, $G_{ij}=1$, and when the edge does not exist, $G_{ij}=0$, $\gamma$ is whether the edge in the optimal graph structure is observed, when the edge is observed, $\gamma=1$, when the edge is not observed, $\gamma=0$, $E_{ij}$ is a number of times when the edge between the node $v_i$ and the node $v_j$ is observed, M is a number of times of observation, and $\eta$ is whether the edge exists in the optimal graph structure, when the edge exists, $\eta=1$, and when the edge does not exist, $\eta=0$.

The optimal adjacency matrix is obtained. After the optimal graph structure is subjected to the adjacency matrix establishment, the optimal adjacency matrix may be obtained.

The high-order neighbor features are obtained. A calculation process of the second feature extraction treatment adopts the same formula as the first feature extraction treatment, and the high-order neighbor features may be obtained only by replacing the initial neighbor matrix with the optimal neighbor matrix.

In the S5, the node detection result is obtained by carrying out the classification treatment on the high-order neighbor features.

In this embodiment, the high-order neighbor features are treated by a semi-supervised node classification method, which specifically comprises classifying the high-order neighbor features by an activation function softmax and outputting the node prediction label Z. An output form of Z is a matrix, and there is only the detection result 0 or 1 of the abnormal node in the matrix, wherein 0 refers to the normal node and 1 refers to the abnormal node.

After the operation of obtaining the node detection result, an operation of judging an attribute of the node detection result is further comprised. When the attribute of the node detection result is the normal node, the normal node is periodically detected, a certain period is preset, the operations of S1, S2, S3, S4 and S5 are repeatedly carried out, and the normal node is periodically detected, with a detection period of 20 days. When the attribute of the node detection result is the abnormal node, the abnormal node is deleted from the blockchain.

In order to improve an accuracy rate of detection results, in this embodiment, the classification treatment is carried out based on Graph Convolutional Networks (GCN), and a learning parameter θ in the GCN is further optimized, which specifically comprises minimizing the learning parameter θ. The operation of minimizing the learning parameter θ specifically comprises: taking a partial derivative of a loss function first to obtain a gradient of a current round, then updating the loss function in an opposite direction of the gradient, and carrying out iterative updating in this way continuously to obtain an optimal solution of the learning parameter θ, so as to improve the detection accuracy and increase the correctness of the node prediction Z. A calculation formula is as follows:

$$\min_{\theta} \mathcal{L}(A, X, Y_l) = -\sum_{v_i \in V_l} y_i \ln z_i$$

wherein, L( ) is the loss function, A is the initial adjacency matrix, and X is the node feature matrix. Because semi-supervised node classification is adopted, some nodes $V_1=\{v_1, v_2, \ldots, v_l\}$ need to be assigned with labels $Y_l=\{y_1, y_2, \ldots, y_l\}$. $y_l$ is the label of $v_i$.

Figure 2:
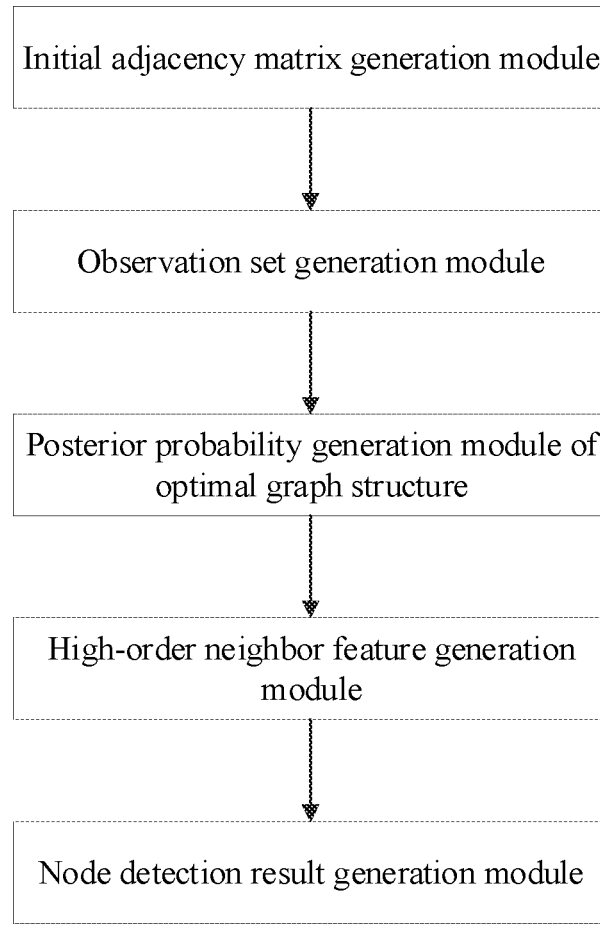
FIG. 2 is a schematic structural diagram of a system for detecting in an embodiment.

This embodiment provides a system for detecting an abnormal node in a blockchain, which, with reference to FIG. 2, comprises:

an initial adjacency matrix generation module configured for acquiring a node data set, converting the node data set into an initial graph structure, and obtaining an initial adjacency matrix based on the initial graph structure;

an observation set generation module configured for obtaining a node representation by carrying out a first feature extraction treatment on the initial adjacency matrix; and obtaining an observation set based on the node representation;

a posterior probability generation module of an optimal graph structure configured for obtaining a probability of existence of an optimal graph structure based on edge information between nodes; obtaining a probability of existence of an edge in the optimal graph structure based on the observation set and edge observation information between nodes in the optimal graph structure; and obtaining a posterior probability of the optimal graph structure by carrying out a conditional probability treatment on the probability of existence of the optimal graph structure and the probability of existence of the edge in the optimal graph structure;

a high-order neighbor feature generation module configured for obtaining the optimal graph structure by carrying out an expectation maximization treatment on the posterior probability of the optimal graph structure; obtaining an optimal adjacency matrix based on the optimal graph structure; and obtaining the high-order neighbor features by carrying out a second feature extraction treatment on the optimal adjacency matrix; and a node detection result generation module configured for obtaining a node detection result by carrying out a classification treatment on the high-order neighbor features.

Figure 3:
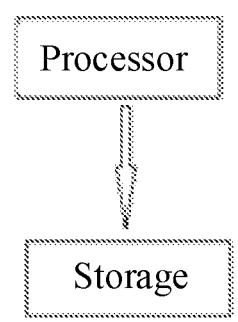
FIG. 3 is a schematic structural diagram of a device for detecting in an embodiment.

This embodiment provides a device for detecting an abnormal node in a blockchain, which, with reference to FIG. 3, comprises a processor and a storage, wherein when the processor executes a computer program stored in the storage, the method for detecting the abnormal node in the blockchain above is realized.

This embodiment provides a computer-readable storage medium, which is configured for storing a computer program, wherein when the computer program is executed by a processor, the method for detecting the abnormal node in the blockchain above is realized.

This embodiment provides the method for detecting the abnormal node in the blockchain, in which the observation set is established based on the node representation with rich information obtained by carrying out the first feature extraction treatment on the initial adjacency matrix, the observation model is established by combining the observation set with edge observation information between nodes to obtain the probability of existence of the edge in the optimal graph structure, the probability of existence of the optimal graph structure is obtained based on the edge information between nodes at the same time, the posterior probability of the optimal graph structure is obtained after carrying out a Bayesian analysis treatment on the probability of existence of the optimal graph structure and the probability of existence of the edge in the optimal graph structure, so that it is expected to maximize the posterior probability of the optimal graph structure to obtain the optimal graph structure, node data are extracted and analyzed in a defeatured manner through various information sources, and finally, a high-quality graph structure with high accuracy, strong applicability and small error is obtained, so that the high-order neighbor features with rich feature information are obtained, thus being convenient for further classification and detection, improving the accuracy of detection results to update a node authority according to the detection results, and being beneficial for maintaining the safety of blockchain.

We claim:

1. A method for detecting an abnormal node in a blockchain, comprising the following operations of:

S1: acquiring a node data set, converting the node data set into an initial graph structure, and obtaining an initial adjacency matrix based on the initial graph structure;

S2: obtaining a node representation by carrying out a first feature extraction treatment on the initial adjacency matrix; and obtaining an observation set based on the node representation;

S3: obtaining a probability of existence of an optimal graph structure based on edge information between nodes in the initial graph structure; obtaining a probability of existence of an edge in the optimal graph structure based on the observation set and edge observation information between nodes in the optimal graph structure; and obtaining a posterior probability of the optimal graph structure by carrying out a conditional probability treatment on the probability of existence of the optimal graph structure and the probability of existence of the edge in the optimal graph structure;

S4: obtaining the optimal graph structure by carrying out an expectation maximization treatment on the posterior probability of the optimal graph structure; obtaining an optimal adjacency matrix based on the optimal graph structure; and obtaining high-order neighbor features by carrying out a second feature extraction treatment on the optimal adjacency matrix; and S5: obtaining a node detection result by carrying out a classification treatment on the high-order neighbor features;

wherein, the operation of obtaining the probability of existence of the optimal graph structure in S3 is realized by the following formula:

$$P(\hat{G}|\Phi,Z,Y_l)=\Pi_{i<j}\Phi_{c_ic_j}^{G_{ij}}(1-\Phi_{c_ic_j})^{1-G_{ij}},$$

wherein, $P(\hat{G}|\Phi, Z, Y_l)$ is the probability of existence of the optimal graph structure, $\hat{G}$ is the optimal graph structure, $\Phi$ is whether a node between communities has an edge, when the node has the edge, $\Phi=1$, when the node does not have the edge, $\Phi=0$, Z is a node prediction label, $Y_l$ is a node input label, $\Phi_{c_jj_i}^{G_{ij}}$ is a probability of existence of an edge between a node $v_i$ in a community $c_i$ and a node $v_j$ in a community $c_j$, $(1-\Phi_{c_jj_i})^{1-G_{ij}}$ is a probability of non-existence of the edge between the node $v_i$ and the node $v_j$, $\Phi_{c_jj_i}^{G_{ij}}$ is a probability of existence of an edge between the community $c_i$ and the community $c_j$, $G_{ij}$ is whether an edge exists between the node $v_i$ and the node $v_j$, when the edge exists, $G_{ij}=1$, and when the edge does not exist, $G_{ij}=0$;

the operation of obtaining the probability of existence of the edge in the optimal graph structure in S3 is realized by the following formula:

$$P(O|\hat{G},\gamma,\eta)=\Pi_{i<j}[\gamma^{E_{ij}}(1-\gamma)^{M-E_{ij}}\times[\eta^{E_{ij}}(1-\eta)^{M-E_{ij}}]^{1-G_{ij}},$$

wherein, $P(O|\hat{G}, \gamma, \eta)$ is the probability of existence of the edge in the optimal graph structure, O is the observation set, $\gamma$ is whether the edge in the optimal graph structure is observed, when the edge is observed, $\gamma=1$, when the edge is not observed, $\gamma=0$, 77 is whether the edge exists in the optimal graph structure, when the edge exists, $\eta=1$, when the edge does not exist, $\eta=0$, $E_{ij}$ is a number of times when the edge between the node $v_i$ and the node $v_j$ is observed, M is a number of times of observation, $G_{ij}$ is whether the edge exists between the node $v_i$ and the node $v_j$, when the edge exists, $G_{ij}=1$, and when the edge does not exist, $G_{ij}=0$;

the operation of obtaining the posterior probability of the optimal graph structure in S3 is realized by the following formula:

$$P(\hat{G},\Phi,\gamma,\eta\,|\,O,Z,Y_l) = \frac{P(O\,|\,\hat{G},\gamma,\eta)P(\hat{G}\,|\,\Phi,Z,Y_L)P(\Phi)P(\gamma)P(\eta)}{P(O,Z,Y_L)},$$

wherein, $P(\hat{G}, \Phi, \gamma, \eta|O, Z, Y_L)$ is the posterior probability of the optimal graph structure, $P(\Phi)$ is a probability of existence of the edge of the node between communities, when the edge exists, $P(\Phi)=1$, when the edge does not exist, $P(\Phi)=0$, $P(\gamma)$ is a probability of observation of the edge in the optimal graph structure, when the edge is observed, $P(\gamma)=1$, when the edge is not observed, $P(\gamma)=0$, $P(\eta)$ is a probability of existence of the edge in the optimal graph structure, when the edge exists, $P(\eta)=1$, and when the edge does not exist, $P(\eta)=0$; and $P(O|, \hat{G}, \gamma, \eta)$ is a probability of existence of the edge in the optimal graph structure, $P(\hat{G}|\Phi, Z, Y_l)$ is a probability of existence of the optimal graph structure, and $P(O, Z, Y_l)$ is a probability of co-existence of the observation set, the prediction label and the input label; and the operation of obtaining the optimal graph structure in S4 is realized by the following formula:

$$\hat{G} = \frac{\Phi_{c_ic_j}\gamma^{E_{ij}}(1-\gamma)^{M-E_{ij}}}{\Phi_{c_ic_j}\gamma^{E_{ij}}(1-\gamma)^{M-E_{ij}} + (1-\Phi_{c_ic_j})\eta^{E_{ij}}(1-\eta)^{M-E_{ij}}}.$$

2. The detection method according to claim 1, wherein the operation of obtaining the observation set in S2 specifically comprises:
obtaining a nearest neighbor graph based on the node representation and a node data feature, and obtaining the observation set by adding the initial adjacency matrix into the nearest neighbor graph.

3. The detection method according to claim 1, wherein after the operation of obtaining the node detection result in S5, an operation of judging an attribute of the node detection result is further comprised,
when the attribute of the node detection result is a normal node, the normal node is periodically detect; and
when the attribute of the node detection result is an abnormal node, the abnormal node is deleted from the blockchain.

4. A system for detecting an abnormal node in a blockchain, comprising:
an initial adjacency matrix generation module configured for acquiring a node data set, converting the node data set into an initial graph structure, and obtaining an initial adjacency matrix based on the initial graph structure;
an observation set generation module configured for obtaining a node representation by carrying out a first feature extraction treatment on the initial adjacency matrix; and obtaining an observation set based on the node representation;
a posterior probability generation module of an optimal graph structure configured for obtaining a probability of existence of an optimal graph structure based on edge information between nodes in the initial graph structure; obtaining a probability of existence of an edge in the optimal graph structure based on the observation set and edge observation information between nodes in the optimal graph structure; and obtaining a posterior probability of the optimal graph structure by carrying out a conditional probability treatment on the probability of existence of the optimal graph structure and the probability of existence of the edge in the optimal graph structure;
a high-order neighbor feature generation module configured for obtaining the optimal graph structure by carrying out an expectation maximization treatment on the posterior probability of the optimal graph structure; obtaining an optimal adjacency matrix based on the optimal graph structure; and obtaining the high-order neighbor features by carrying out a second feature extraction treatment on the optimal adjacency matrix; and a node detection result generation module configured for obtaining a node detection result by carrying out a classification treatment on the high-order neighbor features;

in the posterior probability generation module of the optimal graph structure, the operation of obtaining the optimal graph structure is realized by the following formula:

$$P(\hat{G}|\Phi,Z,Y_l)=\Pi_{i<j}\Phi_{c_ic_j}^{G_{ij}}(1-\Phi_{c_ic_j})^{1-G_{ij}},$$

wherein, $P(\hat{G}|\Phi, Z, Y_l)$ is the probability of existence of the optimal graph structure, $\hat{G}$ is the optimal graph structure, $\Phi$ is whether a node between communities has an edge, when the node has the edge, $\Phi=1$, when the node does not have the edge, $\Phi=0$, Z is a node prediction label, $Y_l$ is a node input label, $\Phi_{c_jj_i}^{G_{ij}}$ is a probability of existence of an edge between a node $v_i$ in a community $c_i$ and a node $v_j$ in a community $c_j$, $(1-\Phi_{c_jj_i})^{1-G_{ij}}$ is a probability of non-existence of the edge between the node $v_i$ and the node $v_j$, $\Phi_{c_jj_i}^{G_{ij}}$ is a probability of existence of an edge between the community $c_i$ and the community $c_j$, $G_{ij}$ is whether an edge exists between the node $v_i$ and the node $v_j$, when the edge exists, $G_{ij}=1$, and when the edge does not exist, $G_{ij}=0$;

in the posterior probability generation module of the optimal graph structure, the operation of obtaining the probability of existence of the edge in the optimal graph structure is realized by the following formula:

$$P(O|\hat{G},\gamma,\eta)=\Pi_{i<j}[\gamma^{E_{ij}}(1-\gamma)^{M-E_{ij}}]^{G_{ij}}\times[\eta^{E_{ij}}(1-\eta)^{M-E_{ij}}]^{1-G_{ij}},$$

wherein, $P(O|\hat{G}, \gamma, \eta)$ is the probability of existence of the edge in the optimal graph structure, O is the observation set, $\gamma$ is whether the edge in the optimal graph structure is observed, when the edge is observed, $\gamma=1$, when the edge is not observed, $\gamma=0$, $\eta$ is whether the edge exists in the optimal graph structure, when the edge exists, $\eta=1$, when the edge does not exist, $\eta=0$, $E_{ij}$ is a number of times when the edge between the node $v_i$ and the node $v_1$ is observed, M is a number of times of observation, $G_{ij}$ is whether the edge exists between the node $v_i$ and the node $v_1$, when the edge exists, $G_{ij}=1$, and when the edge does not exist, $G_{ij}=0$;

in the posterior probability generation module of the optimal graph structure, the operation of obtaining the probability of existence of the edge in the optimal graph structure is realized by the following formula:

$$P(\hat{G}, \Phi, \gamma, \eta \mid O, Z, Y_l) = \frac{P(O \mid \hat{G}, \gamma, \eta)P(\hat{G} \mid \Phi, Z, Y_L)P(\Phi)P(\gamma)P(\eta)}{P(O, Z, Y_L)},$$

wherein, $P(\hat{G}, \Phi, \gamma, \eta|O, Z, Y_L)$ is the posterior probability of the optimal graph structure, $P(\Phi)$ is a probability of existence of the edge of the node between communities, when the edge exists, $P(\Phi)=1$, when the edge does not exist, $P(\Phi)=0$, $P(\gamma)$ is a probability of observation of the edge in the optimal graph structure, when the edge is observed, $P(\gamma)=1$, when the edge is not observed, $P(\gamma)=0$, $P(\eta)$ is a probability of existence of the edge in the optimal graph structure, when the edge exists, $P(\eta)=1$, and when the edge does not exist, $P(\eta)=0$; and $P(O|\hat{G}, \gamma, \eta)$ is a probability of existence of the edge in the optimal graph structure, $P(\hat{G}|\Phi, Z, Y_l)$ is a probability of existence of the optimal graph structure, and $P(O, Z, Y_l)$ is a probability of co-existence of the observation set, the prediction label and the input label; and in the high-order neighbor feature generation module, the operation of obtaining the optimal graph structure is realized by the following formula:

$$\hat{G} = \frac{\Phi_{c_ic_j}\gamma^{E_{ij}}(1-\gamma)^{M-E_{ij}}}{\Phi_{c_ic_j}\gamma^{E_{ij}}(1-\gamma)^{M-E_{ij}} + (1-\Phi_{c_ic_j})\eta^{E_{ij}}(1-\eta)^{M-E_{ij}}}.$$

* * * * *